(12) United States Patent
Fleig et al.

(10) Patent No.: US 7,356,610 B2
(45) Date of Patent: Apr. 8, 2008

(54) SYSTEMS AND METHODS FOR MONITORING NETWORK EXCHANGES BETWEEN A CLIENT AND A SERVER

(75) Inventors: Roger A. Fleig, Redmond, WA (US); Denis L. Ruckebusch, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 413 days.

(21) Appl. No.: 10/834,463

(22) Filed: Apr. 29, 2004

(65) Prior Publication Data

US 2005/0021743 A1 Jan. 27, 2005

Related U.S. Application Data

(62) Division of application No. 09/579,946, filed on May 26, 2000, now Pat. No. 6,748,431.

(51) Int. Cl.
*G06F 13/00* (2006.01)
(52) U.S. Cl. ...................................................... 709/238
(58) Field of Classification Search ........ 709/223–224; 726/2, 22
See application file for complete search history.

(56) References Cited

U.S. PATENT DOCUMENTS 5,505,449 A * 4/1996 Eberhardt et al. ............ 463/29
5,787,253 A * 7/1998 McCreery et al. .......... 709/231
6,453,360 B1 * 9/2002 Muller et al. ............... 709/250
6,724,721 B1 * 4/2004 Cheriton ..................... 370/229
7,027,437 B1 * 4/2006 Merchant et al. ........... 370/389

* cited by examiner

*Primary Examiner*—Robert B. Harrell
(74) *Attorney, Agent, or Firm*—Workman Nydegger

(57) ABSTRACT

Systems and methods for monitoring exchanges between a client and a server across a network. Implementation of the present invention takes place in association with a client and server that use standard Internet protocol to exchange requests and responses over a network. An extendable network monitor is employed to obtain a network monitor trace. Entire requests and responses are rebuilt. Chunked information is coalesced. Interleaved packets are collected. Bodies of data written in extensible markup language are reformatted by including white space and highlighting important data. Bodies of data written in hyper-text markup language are optionally removed from the requests and responses. As such, and in accordance with the present invention, the requests and responses exchanged by a client and a server across a network are made easily readable to a user, thereby allowing the user to read, interpret, and analyze the exchanges to ensure that the exchanges occurred correctly and as expected.

5 Claims, 4 Drawing Sheets

SYSTEMS AND METHODS FOR MONITORING NETWORK EXCHANGES BETWEEN A CLIENT AND A SERVER

CROSS-REFERENCE TO RELATED APPLICATIONS

This application is a divisional of U.S. application Ser. No. 09/579,946, filed May 26, 2000, now U.S. Pat. No. 6,748,431 entitled "Systems and Methods for Monitoring Network Exchanges Between a Client and a Server." For purposes of disclosure, the foregoing application is incorporated herein by reference.

BACKGROUND OF THE INVENTION

1. The Field of the Invention

The present invention relates to systems and methods for monitoring exchanges between a client and a server across a network. More specifically, the present invention relates to systems and methods that read a network monitor trace and rebuild the requests and responses to make the exchanges easily readable to a user by rebuilding entire requests and responses, coalescing chunked information, collecting interleaved packets, reformatting extensible markup language ("XML") bodies, if present, and optionally removing any hyper-text markup language ("HTML") bodies from the requests and responses.

2. The Relevant Technology

The Internet protocol known as hyper-text transfer protocol—distributed authoring and versioning ("HTTP/Dav") is becoming the foundation for application development on exchange server technology, which employs a client/server relationship. The HTTP/Dav protocol uses XML to execute requests and corresponding responses between a client and a server across a network.

The requests and responses pass through a protocol stack in order to be transmitted across the network. To provide a more efficient transmission across the network, it is customary for a protocol stack to dissect the request or response that passes through the stack into fragments. The fragments are then incorporated into blocks of data, known as "packets," which are in the form of long buffers of bytes. The packets are then individually sent across the network connection. As such, and by way of example, a given request sent by a client to a server across a network can comprise many packets.

While standard Internet protocol ensures that the packets of a specific request or response will be properly ordered once received, all of the packets that correspond to a given request or response are not necessarily transmitted together. Instead, the packets corresponding to a request or response are interleaved with packets that correspond to other requests and/or responses in order to optimize the transmission of data across the network.

To further optimize the transmission of data across the network, the data in the body of the packet is frequently "chunked." This means that rather than placing the data into a single buffer, the data is strung together. Therefore, by way of example, if a client communicates a 32-kilobyte request to a server, this request may be chunked into one or more segments that are strung together, each segment being transmitted individually to the server.

The requests and responses exchanged between a client and a server are visible to a network monitor. The network monitor, also referred to as a "packet sniffer," sees the packets that are transmitted across the network, arranges the packets in the order that they were sent, and creates a trace.

While a network monitor trace is valuable for recording the HTTP/Dav activity, it is a very poor tool for analyzing the activity because it understands neither HTTP/Dav protocol nor XML. The trace displays the network packets as a very unfriendly jumble of bytes in what is known as the frame viewer window, which may provide, by way of example, six columns of text (generally in hex) that is six bytes wide and twenty pages deep. The reading of the trace is further complicated when the data is chunked because the data is all strung together. Furthermore, the reading of the trace becomes even more complicated because of the interleaving of the transmitted packets. As such, upon desiring to read the portion of the trace specific to a given request and/or response, a reader easily confuses data that he/she believes corresponds to the given request and/or response with data that corresponds to other requests and/or responses.

BRIEF SUMMARY OF THE INVENTION

The present invention relates to systems and methods for monitoring exchanges between a client and a server across a network. More specifically, the present invention relates to systems and methods that read a network monitor trace and rebuild the requests and responses to make the exchanges easily readable to a user by rebuilding entire requests and responses, coalescing chunked information, collecting interleaved packets, reformatting XML bodies if present, and optionally removing any HTML bodies from the requests and responses.

Embodiments of the present invention may be practiced in network computing environments with many types of computer system configurations and provide a mechanism that allows for the viewing, interpretation and analysis of, by way of example, a network exchange between a client and a server.

Embodiments of the present invention employ an extendable network monitor, such as by way of example, Full Netmon, to record the exchanges transmitted across a network. The network monitor obtains a copy of the exchange in a network monitor trace that is displayed in a very unfriendly jumble of bytes. The systems and methods of the present invention can call on, by way of example, an executable program module to allow the exchanges to be made easily readable so that the exchanges can be interpreted and analyzed to verify that the requests and/or responses occurred correctly and as expected.

The information when exchanged is sent across a network in packets. The packets are gathered and the source and destination of each packet is identified. The packets are distributed to variable locations referred to as "buckets" for storage. Once in a bucket, the packet information is stored in a buffer until all of the packets corresponding to a particular exchange between a client and a server have been received. Once received, the packet information is processed so that the exchange can be read, interpreted and analyzed. The packet information is then flushed and the bucket is reset and made ready to be reused.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to both systems and methods for monitoring exchanges between a client and a server across a network. More specifically, the present invention relates to systems and methods that read a network monitor trace and rebuild the requests and/or responses in such a way as to make the exchanges easily readable to a user by rebuilding entire requests and responses, coalescing chunked information, collecting interleaved packets, reformatting XML bodies if present, and optionally removing any HTML bodies from the requests and responses.

Embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store is desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
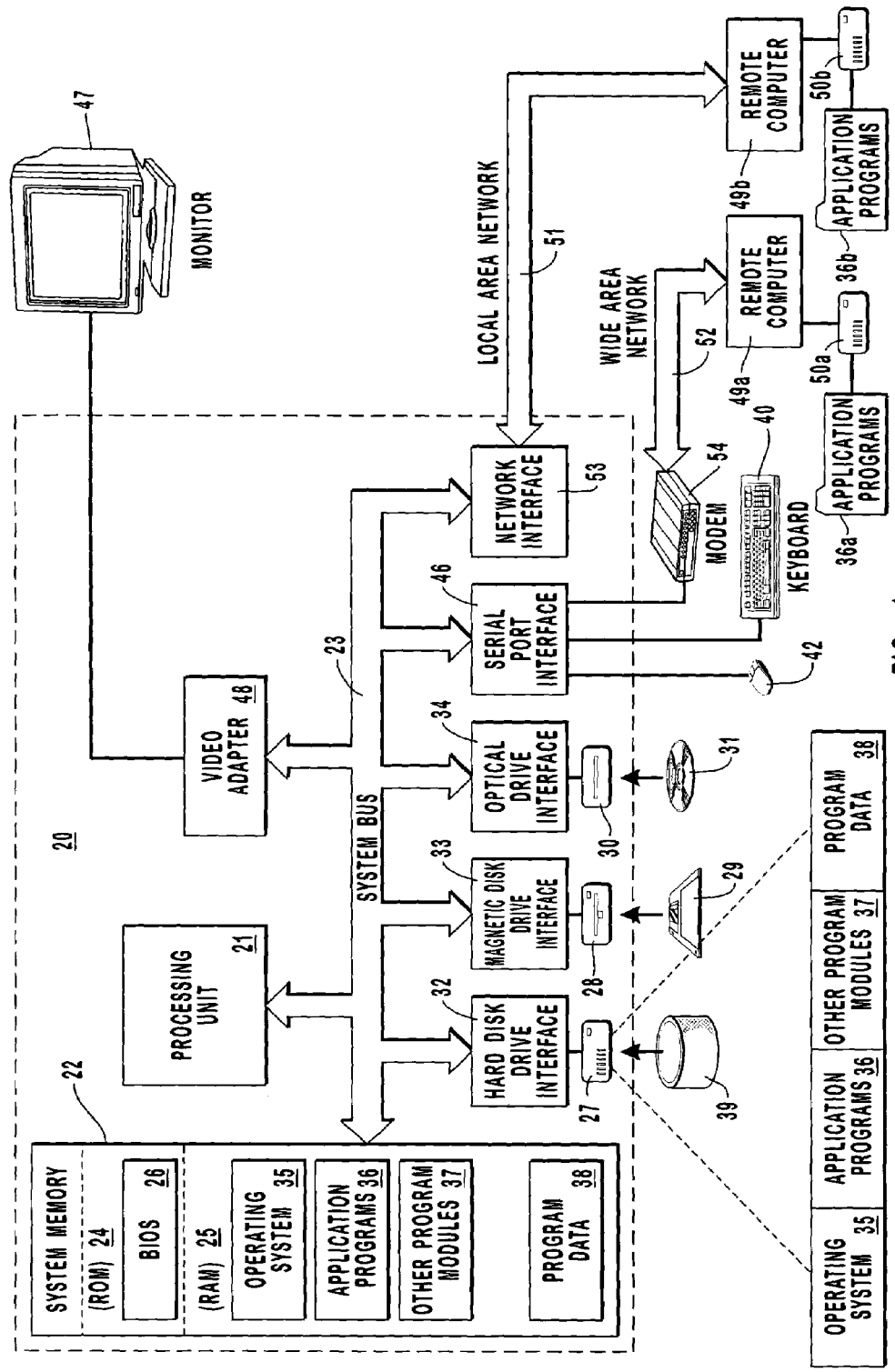
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically includes many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local area network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
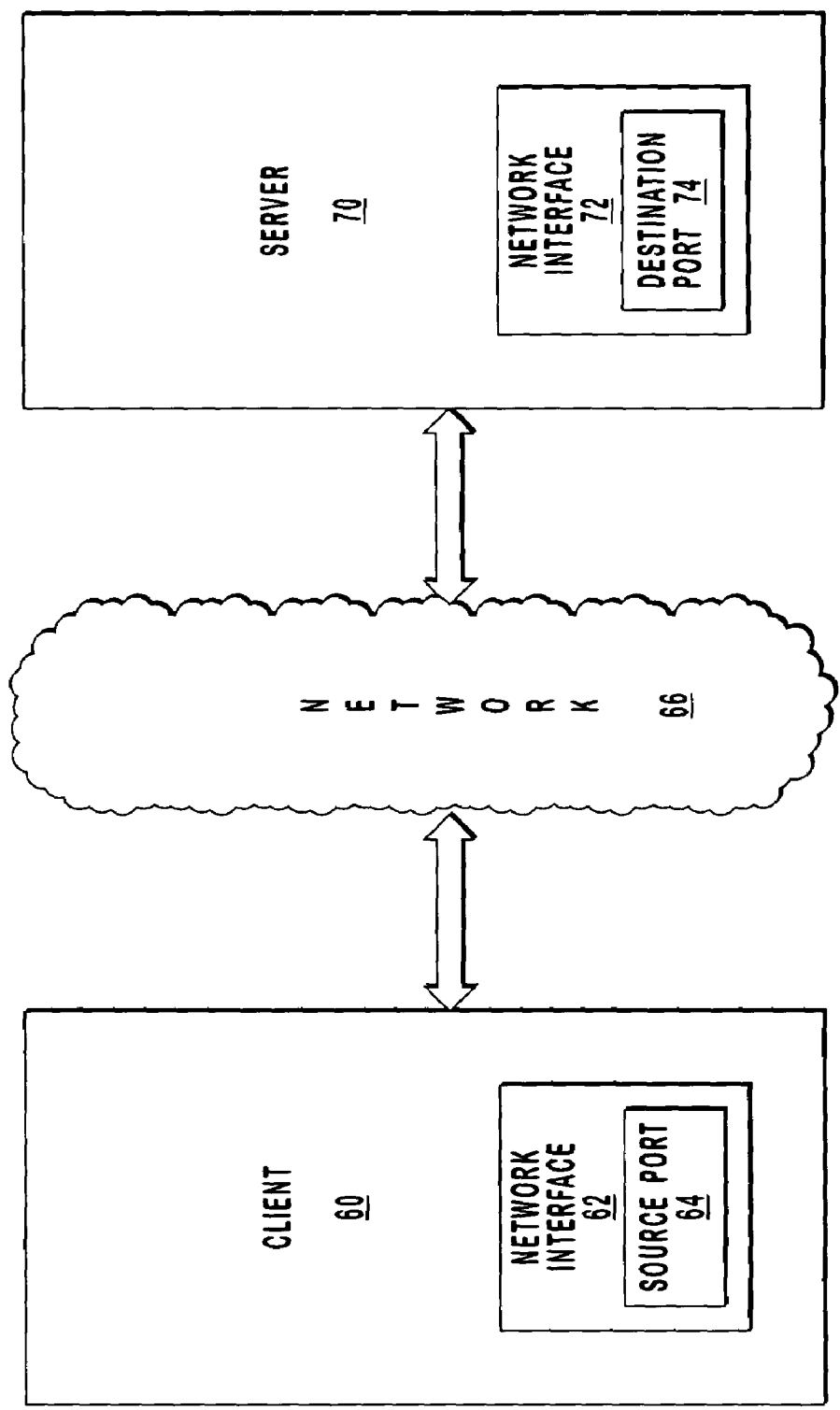
FIG. 2 is a block diagram that illustrates an exemplary configuration for practicing the present invention, where an exchange between a client and a server across a network is monitored to verify that the exchange occurred correctly and as expected.

While those skilled in the art will appreciate that the present invention may be practiced in network computing environments with many types of computer system configurations, FIG. 2 illustrates an exemplary configuration for an exchange to occur between a client and a server across a network such that the exchange can be viewed, interpreted and analyzed to ensure that the exchange occurred correctly and as expected.

In FIG. 2, client 60 is a client that communicates with a server 70 across a network 66. Both client 60 and server 70 include a network interface to enable the communication between client 60 and server 70 across network 66. The network interfaces are respectively illustrated as network interface 62 and network interface 72. Each network interface includes a pathway for data to enter into and exit out of the network interface. The pathway is referred to as a "port."

FIG. 2 illustrates the embodiment where network 66 is the Internet and Internet protocol, such as, by way of example, HTTP/Dav is employed in a client/server configuration. In the configuration, a request for processing is made across the network and is followed by a response that is received in reply to the initial request. By way of example, in the embodiment illustrated in FIG. 2, a request for processing is sent from client 60 and is received by server 70. Since the request originated at client 60 and was sent to server 70, the port included in network interface 62 is illustrated as a source port 64 and likewise the port included in network interface 72 is illustrated as a destination port 74. In reply to the request, server 70 sends back a response to client 60.

It is desirable to be able to view, interpret and analyze the requests and responses exchanged between a source port and a destination port in order to verify that the requests and/or responses occurred correctly and as expected between the client and the server. An extendable network monitor, such as, by way of example, Full Netmon, can be employed to record the exchanges transmitted across a network and can call on, by way of example, an executable program module to allow the exchanges to be easily readable, as will be further discussed below in accordance with FIGS. 3 and 4.

When information is transmitted across a network, the information is individually sent in blocks of data to efficiently transmit the information. These blocks of data are commonly referred to as packets, frames, or datagrams, and each block of data is in the form of a long buffer of bytes. The data blocks or packets are visible to the network monitor, which obtains a copy of the packets, arranges the packets in the order that they were sent, and creates a trace.

While a network monitor creates a trace of the information sent across a network, the packets are displayed in a very unfriendly jumble of bytes within the trace. By way of example, the trace may provide six columns of text (generally in hex) that may be six bytes wide and twenty pages deep. Furthermore, the packets of one request or response are generally interleaved with packets of other requests and/or responses in the trace since that is the way the packets were sent in order to make the data transmission more efficient across the network.

In accordance with the systems and methods of the present invention, the requests and responses can be made to be easily readable and thus the requests and corresponding responses that are exchanged between a client and a server can be interpreted and analyzed to verify that the requests and/or responses occurred correctly and as expected.

Figure 3:
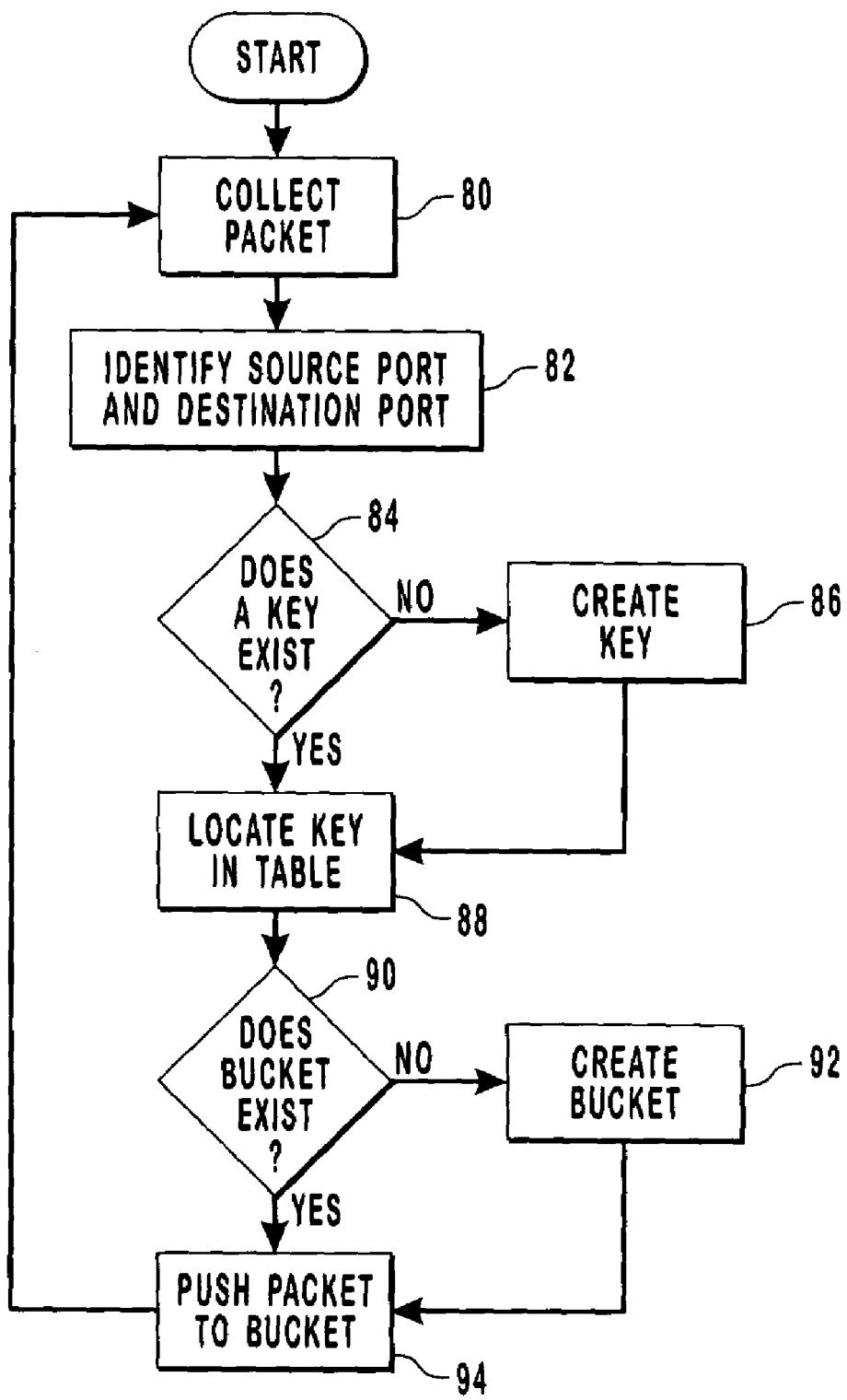
FIG. 3 is a flow chart that details an exemplary embodiment for gathering and distributing the packet information in accordance with the present invention.

Referring now to FIG. 3, a flow diagram is illustrated that details an exemplary embodiment for gathering packets into a network monitor trace, identifying the source and destination of each packet, and distributing the packets to variable locations referred to as "buckets" for storage. Each variable location or bucket uniquely stores packets that have a specific combination of source port and destination port.

As explained above, packets transmitted across a network are visible to a network monitor and in step 80 of FIG. 3 the network monitor collects a packet. The collected packet is an identical copy of the original packet transmitted across the network. In accordance with the present invention, once a packet is collected, execution proceeds to step 82, which identifies the source port and destination port that correspond to the collected packet. By way of example, the collected packet may correspond to a request sent from client 60 of FIG. 2 to server 70 across network 66. In the example, the source and destination ports corresponding to the collected packet would therefore be source port 64 and destination port 74. Every source port and destination port is unique and identifiable and, therefore, each combination of source port and destination port that corresponds to a collected packet is also unique and identifiable.

A numeric code, referred to as a "key," is used to represent the combination of source port and destination port that corresponds to a collected packet. The key can be, by way of example, a 32-bit number that is a unique identifier for an exchange or communication between a given source port and destination port. After the source port and destination port that correspond to the collected packet are identified in step 82, execution proceeds to decision block 84 to determine whether or not a key exists for the combination of source port and destination port that corresponds to the collected packet.

The keys are stored in a listing such as, by way of example, a table, a list, a tree, or the like. In the embodiment illustrated in FIG. 3, the listing is a table and if decision block 84 determines that a key exists for the combination of source port and destination port that corresponds to the collected packet, execution proceeds to step 86 to locate the key in the table. Alternatively, if decision block 84 determines that a key does not exist for the combination of source port and destination port that corresponds to the collected packet, a key is created in step 86 and is included in the table. Upon creating the key in step 86, execution proceeds to step 88 to locate the key in the table.

Once the key is located in the table, decision block 90 determines whether or not a bucket exists for the key. A bucket is a variable location that stores packets having the identical key. The table can, by way of example, correlate existing keys with existing buckets. If a bucket corresponding to the key of the collected packet exists, the collected packet is pushed to the bucket in step 94 for storing the collected packet in the bucket. Alternatively, if decision block 90 determines that a bucket corresponding to the key of the collected packet does not exist, execution proceeds to step 92, where a bucket is created for the key and the collected packet is then pushed to the bucket in step 94 to store the collected packet in the created bucket. Upon pushing the packet to the corresponding bucket, execution returns back to step 80 for the collection of another packet.

In an embodiment of the present invention, the process detailed in FIG. 3 continues and allows a copy of each packet transmitted across a network to be stored in a bucket that corresponds to the key for that collected packet. As such, a bucket collects a variety of packets, each representing part of an exchange made between a client and a server across a network.

Figure 4:
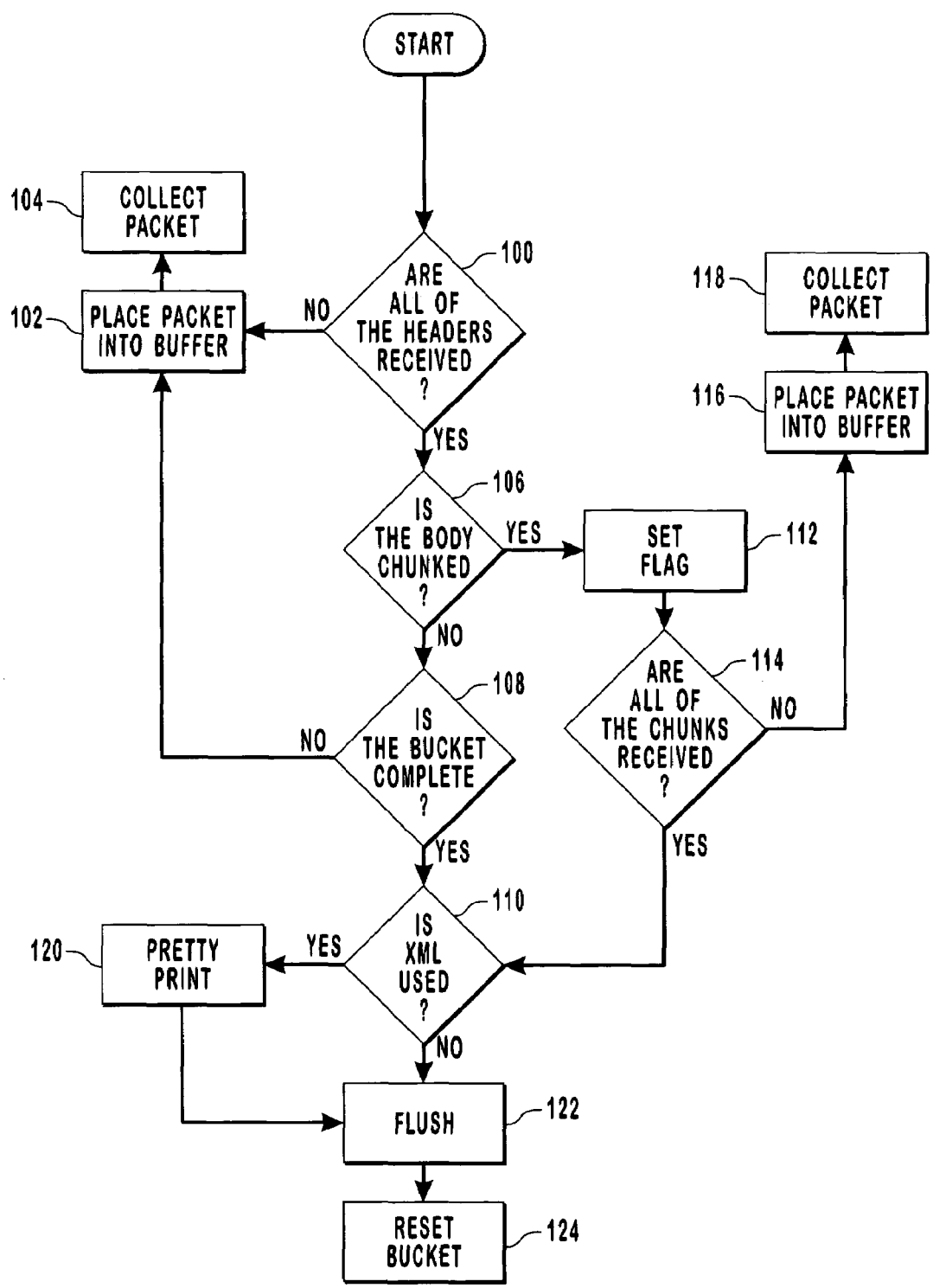
FIG. 4 is a flow chart that details an exemplary embodiment for processing and formatting the packet information so that the exchange represented by the packets can be read, interpreted and analyzed.

Referring now to FIG. 4, a flow chart is illustrated that details an exemplary embodiment for processing and formatting the packet information stored within an individual bucket to ensure that all of the packets corresponding to a particular exchange between a client and a server have been received, and to cause the packet information to be humanly readable in order for the exchange to be interpreted and analyzed.

Once a packet is pushed to a bucket, as illustrated in step 94 of FIG. 3, decision block 100 of FIG. 4 determines whether or not all of the headers have been received. In the embodiment illustrated in FIG. 4, the standard Internet protocol referred to as HTTP is employed for transmitting information over a network. In accordance with HTTP, the headers are separated from the body by an empty line, such as, by way of example, a line with nothing preceding a carriage return line feed ("CRLF"). The reception of an empty line indicates that all of the headers have been received and thus the entire packet has been collected for a particular request-response exchange. If decision block 100 determines that all of the headers have not yet been received, such as, by not having received an empty line, the collected packet is placed into a buffer within the bucket in step 102 and execution proceeds to step 104 where the network monitor collects a packet. (Step 104 of FIG. 4 is identical to step 80 of FIG. 3.)

Alternatively, if decision block 100 determines that all of the headers have been received, indicating that the entire packet has been collected, execution proceeds to decision block 106 for a determination of whether or not the body is chunked.

In accordance with standard Internet protocol, chunked encoding is a way of stringing data together without placing the data in a single buffer. By employing the process of chunked encoding, the transmission of information across a network can be optimized. Therefore, it is common for the body of an HTTP-Dav request or response to be chunked. Decision block 106 separates packets that have undergone a process of chunked encoding from packets that have undergone another encoding process, such as, by way of example, the process of content encoding.

If it is determined at decision block 106 that the collected packet has not undergone a process of chunked encoding, execution proceeds to decision block 108 for a determination of whether the bucket is complete. By way of example, when content encoding is employed, a header called "content length" is used. In accordance with standard Internet protocol, content length provides the number of bytes that are located in the body of an exchange. Therefore, if the number of bytes located in the buffer of the bucket equals the number of bytes provided by content length then decision block 108 determines that all of the packets for a given exchange have been collected. The bucket is therefore complete and execution proceeds to decision block 110.

Alternatively, if the number of bytes located in the buffer of the bucket does not equal the number of bytes provided by "content length," then decision block 108 determines that all of the packets for a given exchange have not been collected. Therefore, the bucket is not complete and execution proceeds to step 102. As provided above, in step 102 the collected packet is placed into a buffer within the uncompleted bucket and execution proceeds to step 104 where the network monitor collects a packet. (Step 104 of FIG. 4 is identical to step 80 of FIG. 3.)

Returning to decision block 106, if it is determined that the body of the HTTP-Dav request or response is chunked, execution proceeds to step 112 where a flag is set. The flag notifies that the body has undergone a process of chunked encoding and thus the content length is unknown. Embodiments in accordance with the present invention account for the situation where the body is chunked and the chunk is split into one or more packets. No relationship exists between the chunked encoding and the separation of the data into packets since the processes occur at different locations of the protocol stack.

At decision block 114, a determination is made as to whether all of the chunks have been received. By way of example, when a body is chunked, each chunk is preceded by a value that indicates the total size of the chunk. Therefore, a determination can be made that an entire chunk has been received when the amount of collected bytes equals or is greater than the value that preceded the chunk. Moreover, a determination is made that all of the chunks have been received when a chunk size of zero is received. If decision block 114 determines that all of the chunks have been received, execution proceeds to decision block 110. Alternatively, if decision block 114 determines that all of the chunks have not been received, execution proceeds to step 116 where the collected packet is placed into a buffer within the corresponding bucket and execution proceeds to step 118 where the network monitor collects a packet. (Step 118 of FIG. 4 is identical to step 80 of FIG. 3.)

At decision block 110 a determination is made as to whether XML is employed. In accordance with standard Internet protocol, a header referred to as "content type" defines the language used, such as, by way of example, XML. If decision block 110 determines that XML is not employed then execution proceeds to step 122. Alternatively, if the content type is XML and therefore XML is employed then the packets in the bucket are pushed through an XML pretty printer in step 120. The XML pretty printer adds white space to the body and highlights important data. Execution then proceeds to step 122.

In step 122 the packet information in the bucket is flushed, meaning the contents of the buffer are emptied onto a disk by printing them to a file, adding them to a database, etc. As such, the requests and/or responses exchanged across a network can be viewed, interpreted and analyzed to ensure that the exchange occurred correctly and as expected. Upon flushing the bucket, execution proceeds to step 124 where the bucket is reset, which includes zeroing out the buffer, so that it can be reused to analyze other network exchanges.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a networked computer system that includes a plurality of interleaved packets transmitted across a network and a plurality of buffers, one or more of the plurality of packets representing a first exchange and one or more of the plurality of packets representing a second exchange, a method for sorting the packets comprising the steps for:

identifying for each transmitted packet a source port and a destination port for the packet;

storing each packet in one of the plurality of buffers, wherein each buffer represents a unique combination of source port and destination port, and wherein each buffer representing the unique combination only stores packets representing an exchange that corresponds to the unique combination that is represented by each respective buffer;

determining whether all transmitted packets representing a first exchange have been stored in a first buffer; and copying the first buffer to a data structure in response to determining that all transmitted packets representing the first exchange have been stored in the first buffer; and resetting the first buffer.

2. A method as recited in claim 1, wherein a code is used to represent the unique combination.

3. A method as recited in claim 1, wherein the step for determining is performed by comparing a number of bytes in the first buffer with a number of bytes provided in a packet header.

4. A method as recited in claim 1, wherein copying the first buffer to a data structure comprises printing contents of the buffer to a file.

5. A method as recited in claim 1, wherein copying the first buffer to a data structure comprises adding the contents of the buffer to a database.

* * * * *